(12) United States Patent
O'Neil

(10) Patent No.: US 8,188,907 B2
(45) Date of Patent: May 29, 2012

(54) AIRCRAFT COLLISION AVOIDANCE ALARM

(75) Inventor: Gary E. O'Neil, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/558,491

(22) Filed: Sep. 12, 2009

(65) Prior Publication Data

US 2011/0063159 A1  Mar. 17, 2011

(51) Int. Cl.
*G01S 13/93* (2006.01)

(52) U.S. Cl. ............... 342/29; 342/36; 342/46; 342/49; 342/57; 340/961

(58) Field of Classification Search .................. 342/195, 342/29–33, 36–38, 46, 49, 50, 57, 58; 340/961
See application file for complete search history.

(56) References Cited

U.S. PATENT DOCUMENTS

| | | | |
|---|---|---|---|
| 3,623,090 A | 11/1971 | Gilbert et al. | |
| 3,925,750 A | 12/1975 | Gilbert et al. | |
| 4,293,857 A * | 10/1981 | Baldwin | 342/32 |
| 4,359,733 A * | 11/1982 | O'Neill | 342/36 |
| 4,454,510 A * | 6/1984 | Crow | 342/32 |
| 5,714,948 A * | 2/1998 | Farmakis et al. | 340/961 |
| 5,798,726 A * | 8/1998 | Schuchman et al. | 342/37 |
| 5,929,783 A * | 7/1999 | King et al. | 340/870.05 |
| 6,604,044 B1 | 8/2003 | Kirk | |
| 7,012,552 B2 * | 3/2006 | Baugh et al. | 340/945 |
| 8,032,265 B2 * | 10/2011 | He | 701/3 |
| 8,068,052 B2 * | 11/2011 | Nakada et al. | 342/29 |
| 2002/0133294 A1* | 9/2002 | Farmakis et al. | 701/301 |
| 2003/0034901 A1 | 2/2003 | Griffin, III | |
| 2005/0200501 A1* | 9/2005 | Smith | 340/963 |
| 2006/0227012 A1* | 10/2006 | He | 340/945 |
| 2011/0063159 A1* | 3/2011 | O'Neil | 342/29 |
| 2011/0298648 A1* | 12/2011 | Ferro | 342/29 |

* cited by examiner

*Primary Examiner* — John B Sotomayor
(74) *Attorney, Agent, or Firm* — Thomas E. Tyson

(57) ABSTRACT

The present invention provides an aircraft collision alarm system and method. The method includes the steps of collecting aircraft position information for aircraft in a given area and digitally encoding this aircraft position information. This aircraft position information is then transmitted on an audio sub-carrier over the voice communications channel of a VOR to the aircraft. The aircraft receives and processes the digitally encoded information and alerts the pilot if a collision alarm situation is present.

10 Claims, 7 Drawing Sheets

AIRCRAFT COLLISION AVOIDANCE ALARM

BACKGROUND OF THE INVENTION

1. Technical Field

The present invention relates to aircraft collision avoidance. In particular, the present invention relates to a collision alarm notification to aircraft.

2. Description of the Related Art

One major concern in modern aviation is the separation of aircraft in flight to prevent airborne collisions. Air Traffic Control (ATC) centers provide a ground-based direction to aircraft over voice channels to instruct and advise pilots and ensure appropriate aircraft separation.

One system that currently exists for aircraft collision avoidance is the Traffic Alert and Collision Avoidance system (TCAS). However, TCAS is very expensive and is mostly used currently in commercial aviation. What is needed is a collision avoidance system suitable for general aviation aircraft.

SUMMARY

In accordance with the present invention, an aircraft communications method is provided that includes the steps of collecting aircraft position information, digitally encoding the aircraft position information, transmitting the digitally encoded information over a voice communications channel to aircraft, receiving the digitally encoded information at an aircraft, decoding the digitally encoded information from the voice communications channel to determine if an alert situation is present, and providing an alert if an alert situation is present.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
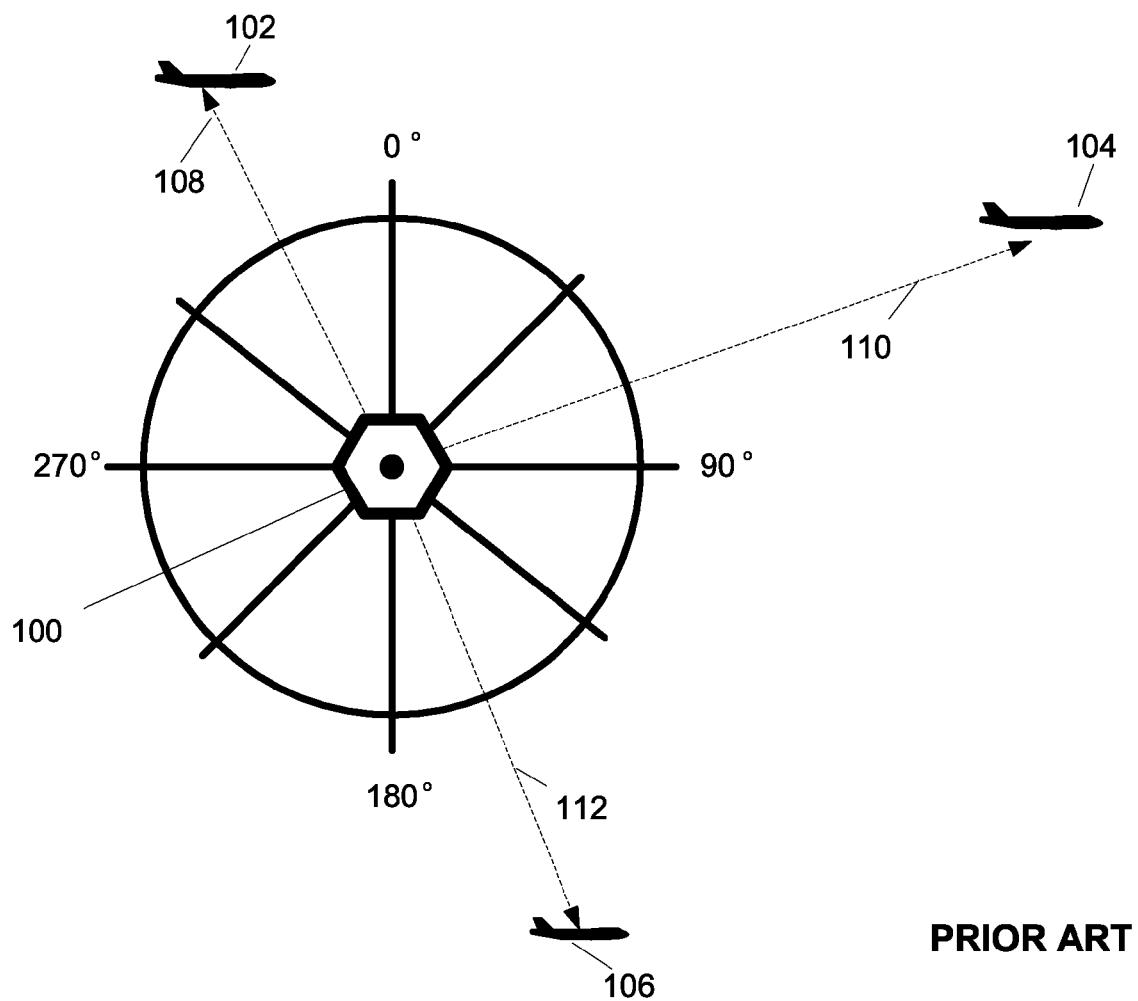
FIG. 1 is a diagram illustrating several aircraft positions in relation to a VOR navigation system.

The following is intended to provide a detailed description of an example of the invention and should not be taken to be limiting of the invention itself. Rather, any number of variations may fall within the scope of the invention, which is defined in the claims following the description.

The present invention is a method, system, and computer program product that provides for detection of potential aircraft collision situations and provides collision alarm notifications for the aircraft involved.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may be implemented entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are implemented via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are implemented on the computer or other programmable apparatus provide processes for implementing the functions/acts specified in the flowchart and/or block diagram block or blocks.

FIG. 1 is an illustration showing a very high frequency (VHF) Omni-directional Radio range navigation station (VOR) 100 and three aircraft 102, 104 and 106 that are positioned in the vicinity of the VOR station 100. Each of these aircraft is located on radials 108, 110, and 112 that indicate the bearing or heading of the aircraft to the VOR station 100. This VOR station may be used with another VOR station received by an aircraft to triangulate the aircraft's exact location. This is done by using the bearing from the first VOR station, the bearing from the second VOR station, and the published location coordinates of the VOR stations used. Additionally, if the aircraft includes distant measuring equipment (DME), an aircraft can use a single bearing from a VOR together with the VOR location coordinates, and the measured distance to locate the aircraft's position. Each aircraft that uses the VOR station for navigation, receives the VOR station radio channel which includes a three letter identifier that is continuously broadcast in the Morse code (on-off keying) as an audible tone over the VOR channel. This channel is also hereinafter referred to as the VOR voice channel or the VOR audio channel. In addition, an Air Traffic Control Center that monitors the area containing the VOR station 100 would also know the position of aircrafts 102, 104 and 106 because of its ground-based radar in addition to received broadcasts from transponders on board the aircraft 102, 104 and 106.

Figure 2:
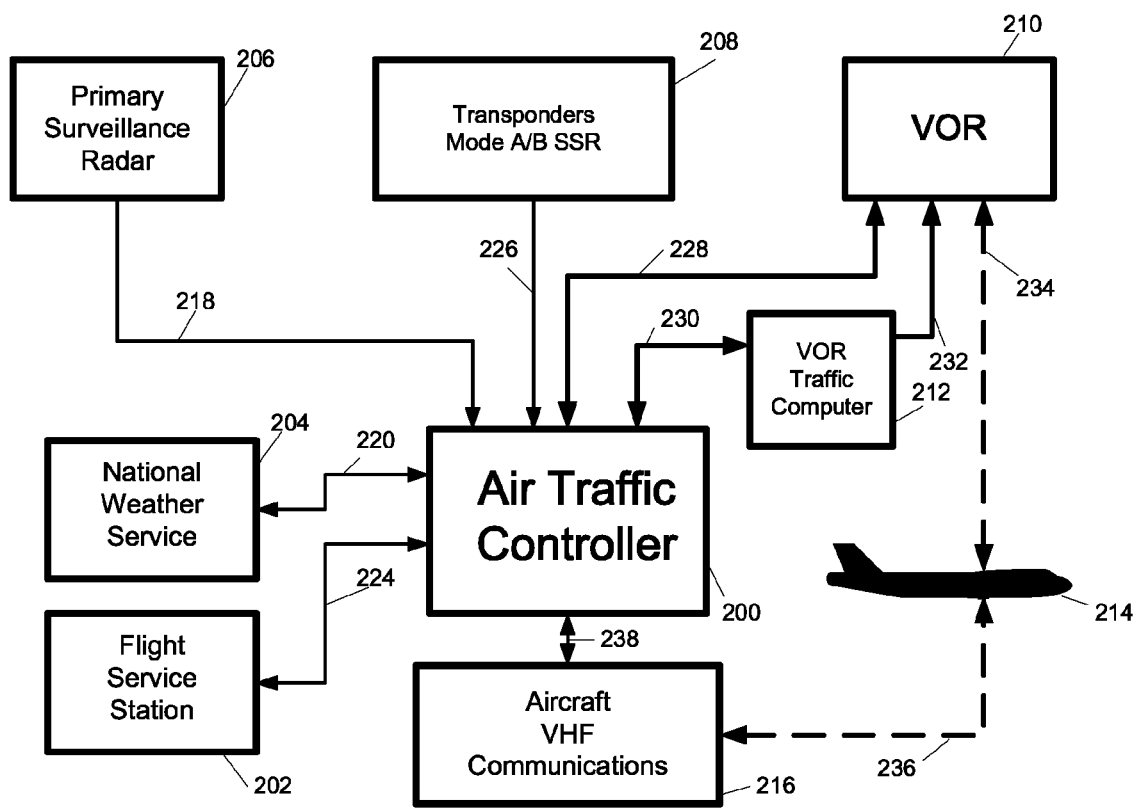
FIG. 2 is a block diagram illustrating an Air Traffic Control Center utilizing the invention.

Referring to FIG. 2, a block diagram of an Air Traffic controller system utilizing the current invention is shown. Specifically, an air traffic controller station which would include a computer and a radar facility would receive aircraft position data from a primary surveillance radar 206 on line 218. Customarily, the air traffic controller uses the display on the radar to monitor the location of aircraft. By monitoring the change of aircraft position over time the course of the aircraft can be easily determined. Additionally, aircraft transponders are received by transponder receiver 208 and provide positive identification of the aircraft on the radar display along with the aircraft altitude on line 226. This aircraft altitude is also customarily displayed. Additionally, the air traffic controller receives other information, such as weather reports from the National Weather Service 204 on line 220 and flight plans filed with the Flight Service Station 202 on line 224. The air traffic controller primarily communicates with the aircraft by aircraft VHF communications 216 on a radio frequency audio link to 36.

In the present invention, the air traffic controller facility would also be connected by line 230 to a VOR traffic computer 212. The purpose of the VOR traffic computer is to store the current aircraft positions and altitudes for aircraft within a radius of VOR stations that are used by aircraft operating in the air traffic controller's area of responsibility. In other words, it is highly possible that a single air traffic control facility may be monitoring an area that includes several VOR stations and, in such case, the facility would include several VOR traffic computers 212 to maintain separately, and independently, the aircraft position data for aircraft in the vicinities of each of the VOR stations. The aircraft 214 communicates with the VOR station 210 by tuning in the VOR radio frequency channel 234, listening to determine the Morse encoded tone identifier of the VOR station, and receiving the VOR radial information that is used for navigation. In accordance with the present invention, the VOR traffic computer 212 would provide aircraft position information in digital form as a narrow bandwidth modulated sub-carrier on line 232 to the VOR 210 which would broadcast to the aircraft 214 in the same manner as the Morse identifier is broadcast on the VOR radio frequency channel 234.

In this embodiment, the ATC data to and from aircraft is superimposed on the VOR voice channel as digital packets of data via a narrowband phase shift modulated subcarrier. A sub-audible (low audio frequency), or ultrasonic (high audio frequency) is chosen, within the bandwidth limitations of a typical voice communications receiver, to serve as the modulated subcarrier center frequency. This is analogous to CTCSS (Continuous Tone-Coded Squelch System) squelch control signaling tones (sub-audible tones that selectively un-mute a receiver or receivers) employed in existing land mobile voice communications systems, as well as the 30 Hz FM modulated ultrasonic reference subcarrier used by the VOR. The subcarrier phase shift modulation is restricted to a narrow bandwidth of approximately 30 Hz, and an amplitude of 6 to 10 dB below a transmitter's nominal 100 percent voice modulation peaks. Conventional baseband (audio) Digital Signal Processing (DSP) using FFT or FIR filtering techniques are employed to achieve reliable modulation waveform detection, and extraction of the encoded digital data.

The suppressed amplitude and frequency components of the modulated waveform are efficiently detected and processed, while being virtually inaudible in communications receivers of moderately good design.

PSK31 is an example of narrowband phase shift keying used extensively by the amateur radio community for low baud rate (31 baud) data terminal to data terminal text messaging communications, and is sufficiently robust to support the limited data traffic volume required to provide collision avoidance support in the line-of-sight operational environment of a VOR.

The narrow occupied bandwidth, low (audio) processing bandwidth, demonstrated performance, and reliability achieved through the use of PSK31 during conditions of high noise and low transmit power levels enable low volume data communications to coexist in a VOR voice channel without disrupting FAA services provided to users of legacy VOR equipment and systems.

Figure 3:
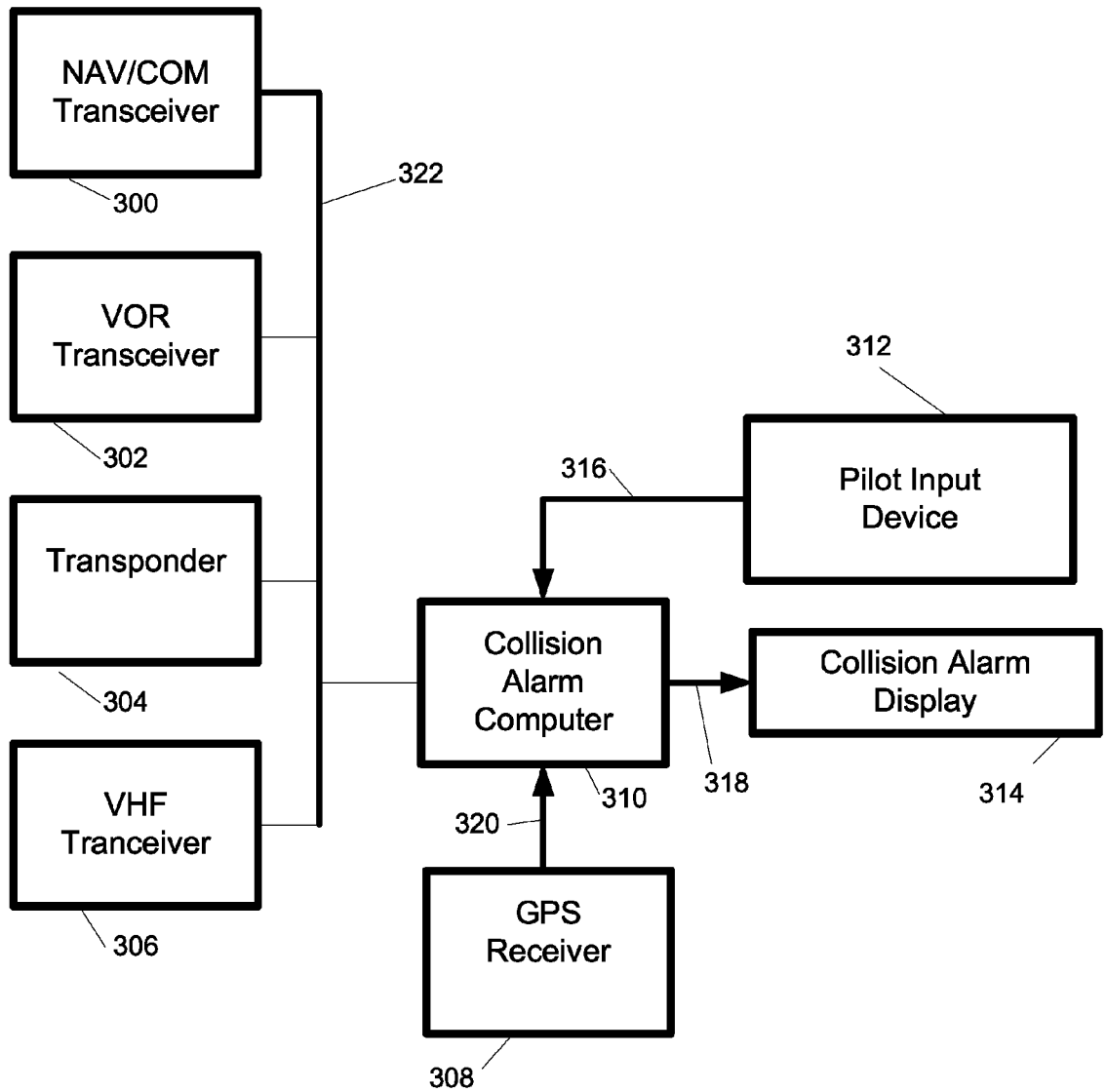
FIG. 3 is a block diagram of the aircraft collision alarm and other aircraft avionics.

FIG. 3 is a block diagram of the typical avionics on board an aircraft utilizing the present invention. Traditional avionics would include the navigation/communications transceiver 300, the VOR transceiver 302, the transponders 304, and a VHF transceiver 306. In the present invention all of these avionic systems are connected by line 332 to the collision alarm computer 310. In one embodiment, channel 332 is an audio channel connecting audio information from any of the avionic sources 300, 302, 304 and 306 to the collision alarm computer 310. In addition, a GPS receiver 308 provides aircraft position information on line 320 to the collision alarm computer 310. Typically, an RS-232 channel is provided on line 320.

According to the present invention, the aircraft position information for all aircraft in a radius of the VOR station is transmitted by the air traffic control facility over the radio frequency audio channel of the VOR. This information is received by the transceiver 300 as detected audio and provided to the collision alarm computer 310 online 322. Using the aircraft's current position information obtained from the GPS receiver 308, the collision alarm computer 310 would process the detected audio to extract the information received from the air traffic control facility and compute the location and course of the other aircraft to determine if a potential collision situation is present. A collision situation is defined as any present or predicted close proximity of one aircraft to another and, in this example, any present or predicted close proximity of this aircraft to any other aircraft. If a collision situation is present, the collision alarm computer 310 would provide an alarm or an alert on line 318 to collision alarm display 314 for the pilot. In this description, the terms alarm and alert are being used interchangeably to indicate a notice of an aircraft close proximity situation. The information displayed may include the altitude, airspeed and bearing of the other aircraft in order to assist the pilot with spotting the air traffic causing the alarm. In addition. the collision alarm computer 310 would include a pilot input device 312 connected by a line 316 to enable the pilot to provide information to the collision alarm computer 310 that might also be provided to the air traffic controller using digital modulation over the return path of the audio channel used to provide the aircraft position information. In one embodiment of the invention, the pilot input device 312 can also be connected to the line 322 to provide information such as the current frequencies that the transceiver 300 are tuned to along with the transponder code 304 and the VOR tuned transceiver frequencies 302 along with other aircraft information such as aircraft ID including tail number, fuel on board, current GPS go-to waypoint or the like.

Figure 4:
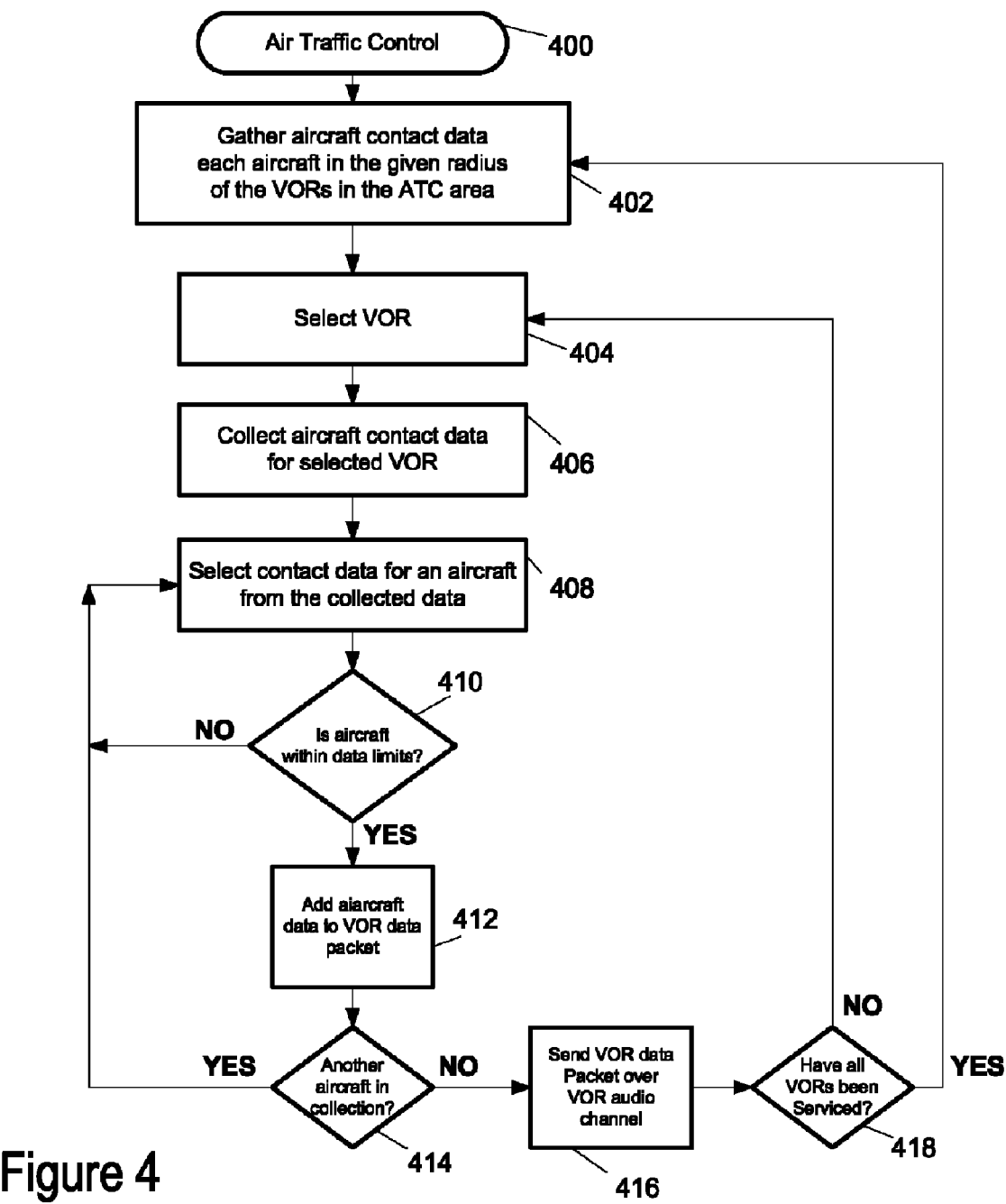
FIG. 4 is a flowchart illustrating the Air Traffic Controller Center VOR traffic computer program providing aircraft with collision alerts.

FIG. 4 is a flow chart illustrating the operation of the invention at the Air Traffic Control Center. In the Air Traffic Control Center process start 400, step 402 is to gather the aircraft position information for all VORs. Again, the aircraft position, airspeed, and course information is gathered for all aircraft for all VOR stations within the Air Traffic Control Center's area of responsibility. Then in step 404, a single VOR station is selected among the several VOR stations being monitored. In step 406, the aircraft information for that VOR is collected such that only the aircraft information included is for those aircraft within the service area of the selected VOR. In step 408, an aircraft's data is selected from the collected set of aircraft data for the selected VOR. In step 410, it is determined whether that aircraft is within a set of data limits. In other words, high-altitude aircraft may not be of interest to low altitude to aircraft so high altitude aircraft position information would not need to be included for low altitude aircraft. If an aircraft location is of no interest, then the process returns to 408 to select a new aircraft. If in decisions step 410, an aircraft location is of interest, the process would proceed to step 412 to add that aircraft's position data to the VOR data package that will be transmitted. Then the process continues to decision step 414, to determine if there are other aircraft in the collection. If yes, the process returns to step 408. If not, the process proceeds to step 416 to broadcast the aircraft position data packet over the VOR channel to aircraft monitoring the VOR channel. Next in step 418, the process determines if all VOR stations in the Air Traffic Control Center's area of responsibility have been serviced. If not, the process returns to step 404 to select the next VOR. However if all the VOR stations have been serviced, the process returns to step 402 to begin the collection of all aircraft information for all the VOR stations again.

Figure 5:
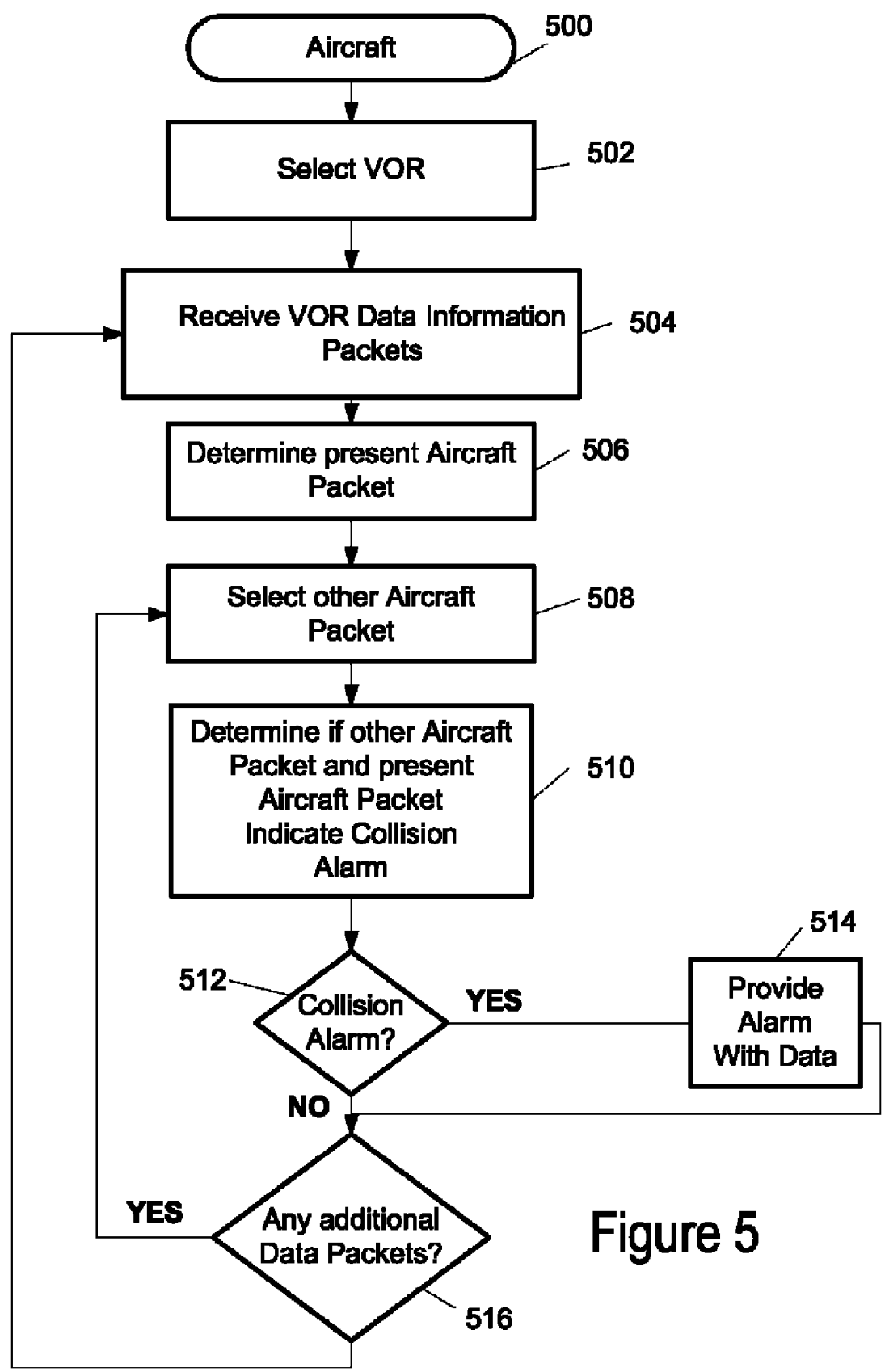
FIG. 5 is a flowchart illustrating the computer program in the aircraft collision alarm computer.

FIG. 5 is a flowchart of the aircraft process 500 onboard the aircraft collision alarm computer 310 of FIG. 3. Since the aircraft may be monitoring more than one VOR station, in step 502, a VOR station is selected. Then in step 504, the collision alarm computer receives the VOR data information packets. This is aircraft position information for aircraft in a vicinity of the VOR station that has been digitally encoded and modulated onto the VOR channel as an audio sub-carrier. In step 506, the collision alarm computer determines its aircraft's present position and eliminates that position data from the received position information. In step 508, the process selects one of the other aircraft data for processing. In step 510, the process determines if, based on the aircraft data including altitude, airspeed, course and location, if there is a potential collision situation. In decision step 512, it is decided whether there should be a collision alarm. If yes, in step 514 the alarm is provided to the pilot, in addition to other available data about the aircraft. However, if no alarm is needed, then, in step 516, it determines if there are any additional data to be examined. In other words, are other aircraft data present that needs evaluated to determine if other collision situations are present. If so, the process returns to step 508. If not, the process returns to step 504, to receive the next set of VOR data packets. It should be noted that if multiple VOR stations are being monitored, the process should be performed for each of the VOR stations being monitored.

Figure 6:
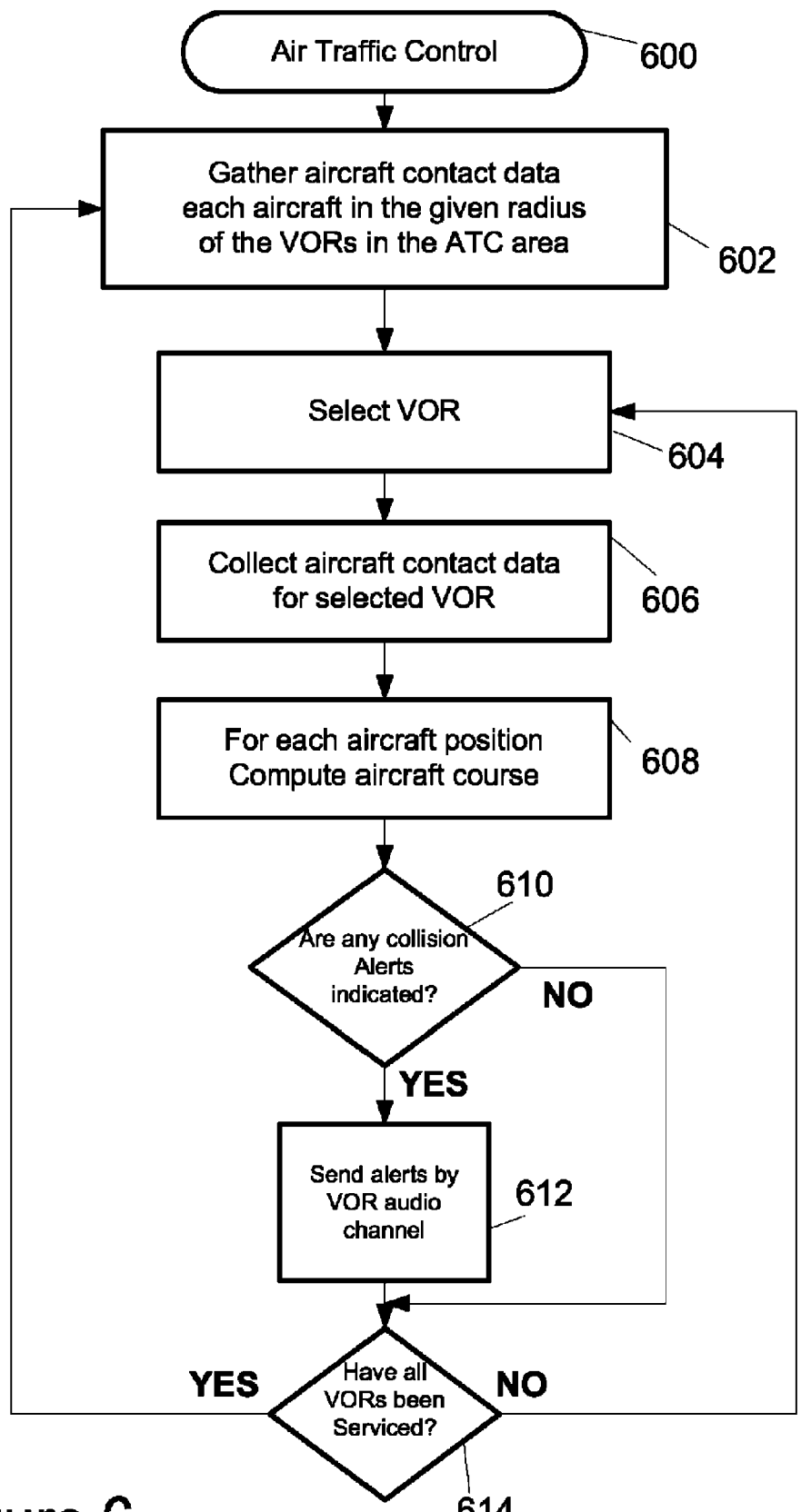
FIG. 6 is a flowchart illustrating an alternate embodiment of the Air Traffic Controller Center VOR traffic computer program providing aircraft with collision alerts.
Figure 7:
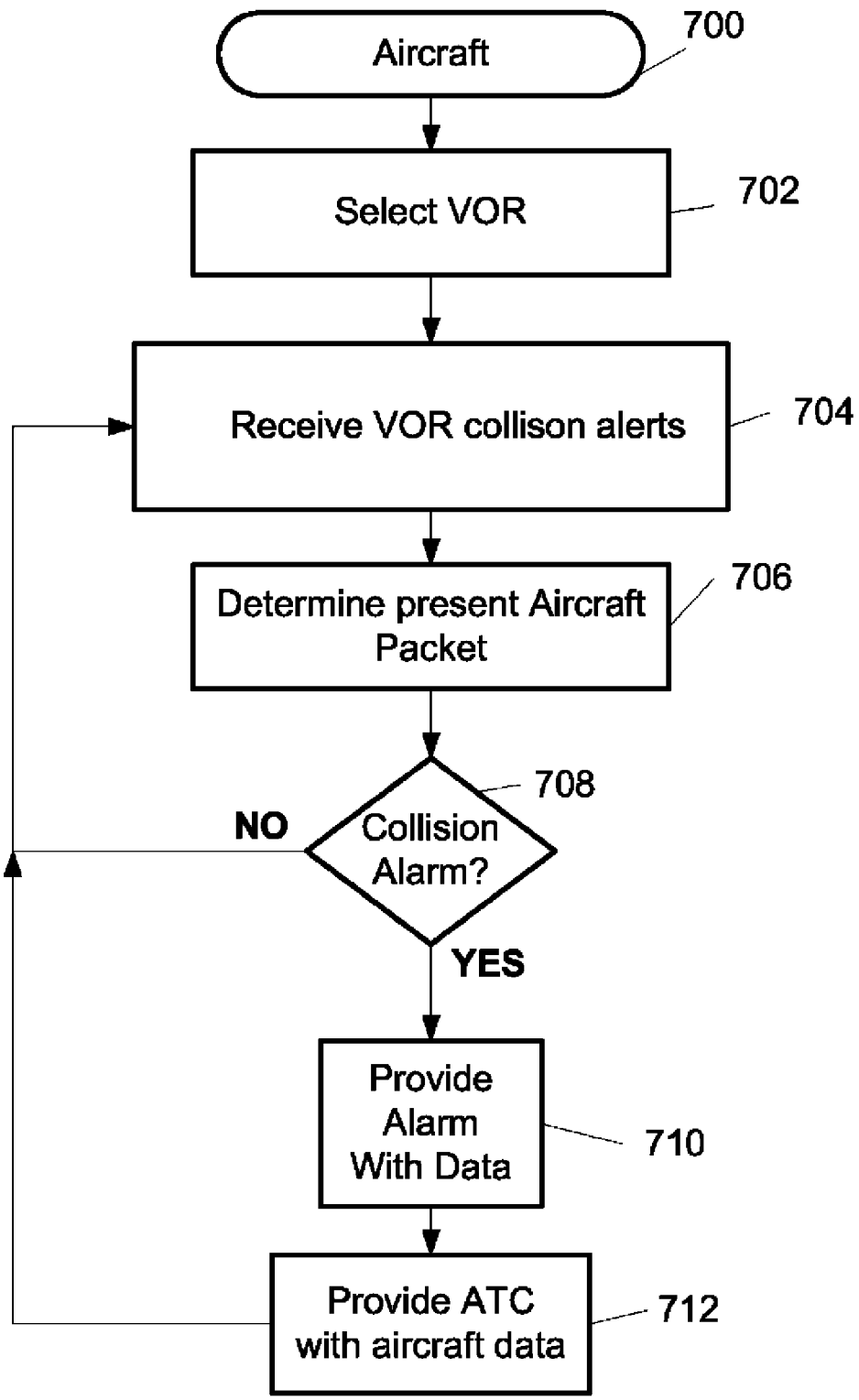
FIG. 7 is a flowchart illustrating an alternate embodiment of the computer program in the aircraft collision alarm computer.

Two alternate embodiments are shown in the flowcharts of FIGS. 6 and 7. Simply, in FIG. 6, the Air Traffic Control facility's VOR traffic computer 212 (FIG. 2) computes the potential collision information to determine if a collision alarm is needed. If so, the alarm is sent over the VOR channel. Likewise in the aircraft collision alarm computer 310 (FIG. 3) and in FIG. 7, the collision alarm computer merely receives the alarms and position information about potential collision threats. It does not independently compute potential collision information.

In FIG. 6, in step 602, the Air Traffic Control facility's VOR traffic computer 212 gathers the aircraft contact information for each aircraft in the vicinity of VOR stations within the Air Traffic Control Center's area of responsibility. In step 604, a single VOR station is selected. In step 606, all the aircraft contact information for that VOR station is compiled. In step 608, The course, altitude, airspeed, and position of all aircraft in the service area of the VOR station are determined. In decision step 610, it is determined if a collision alert is necessary. This is accomplished by estimating flight paths for all aircraft and then determining if two of more aircraft flight paths are projected to be too close in proximity. If yes, then in step 612, the alarms are broadcast by the VOR station on an audio sub-carrier. Returning to step 610, if no such alarms are indicated, the process proceeds to decision step 614 to determine if all of the VOR stations have been serviced. If not, in step 604, a new VOR station is selected. When all VOR stations have been serviced, the process returns to step 602 to gather information for all of the VOR stations again.

FIG. 7 is a flowchart of the operation of the aircraft collision alarm computer 310 for this alternate embodiment. In step 702, a VOR station is selected. In step 704, any collision alerts over the VOR station audio channel are received. In step 706, the collision alarm computer determines its aircraft's position. In decision step 708, it is determined, given the aircraft's position, whether any of the received collision alerts should be displayed. If so, in step 710, the alarm is displayed along with other available data about the collision threat. In step 712, the collision alarm computer provides the Air Traffic Control Center all available information such as position data from its onboard GPS, radio frequencies being monitored, VOR stations being used, altitude, airspeed, transponder ID and other information that may be useful. The process then returns to step 704 to receive further collision alert data from other VOR stations being monitored.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. An aircraft communications method comprising the steps of:
   collecting aircraft position information for a plurality of aircraft from a radar;
   digitally encoding the aircraft position information in a first computer;
   transmitting the digitally encoded information over a transmitter using a voice communications channel to a one of the plurality of aircraft;
   receiving the digitally encoded information at the one aircraft by a receiver on-board the aircraft;
   decoding the digital information from the voice communications channel in a second computer on-board the aircraft;
   analyzing in the second computer the decoded information to determine if an alarm situation is present; and
   providing an alarm from the second computer if an alarm situation is present.

2. A method according to claim 1 wherein the voice communications channel is a VOR navigation system radio channel and wherein the digitally encoded information is superimposed on the voice communications via digital packets of data on a narrow band phase shift modulated subcarrier.

3. A method according to claim 2 wherein the alarm is transmitted over the VOR navigation system radio channel from the second computer.

4. A method according to claim 1 wherein the collecting of aircraft position information includes gathering aircraft position data for aircraft within a radius of a VOR navigation station.

5. A method according to claim 1 wherein the digitally encoded information includes weather information.

6. An aircraft communications method comprising the steps of:
   receiving, on-board an aircraft receiver, digitally encoded aircraft position information indicating locations of other aircraft from a VOR voice communications channel wherein the digitally encoded aircraft position information is superimposed on the voice communications via digital data packets on a narrow band phase shift modulated subcarrier;
   decoding the aircraft position information in a computer on-board the aircraft;
   determining, in the on-board computer, if any of the other aircraft are in close proximity; and
   if so, providing an alarm by the on-board computer.

7. An aircraft communications method according to claim 6 wherein the alarm is transmitted over the VOR voice channel from the on-board computer.

8. An aircraft collision avoidance system comprising;
   a transceiver on-board an aircraft;
   a first computer on-board the aircraft connected to the transceiver implementing the steps of:
   receiving digitally encoded aircraft position information from a VOR voice channel indicating positions of other aircraft;
   decoding the aircraft position information;
   determining if any of the other aircraft are in close proximity; and
   providing an alarm if any of the other aircraft are in close proximity.

9. An aircraft collision avoidance system according to claim 8 wherein said transceiver receives and transmits audio signals and wherein the digitally encoded information is superimposed on the voice communications via digital packets of data on a narrow band phase shift modulated subcarrier.

10. An aircraft collision avoidance system according to claim 8 wherein the alarm is transmitted over the voice channel from the first computer.

\* \* \* \* \*